United States Patent
Allarey et al.

(10) Patent No.: US 8,122,270 B2
(45) Date of Patent: Feb. 21, 2012

(54) VOLTAGE STABILIZATION FOR CLOCK SIGNAL FREQUENCY LOCKING

(75) Inventors: Jose Allarey, Davis, CA (US); Sanjeev Jahagirdar, Folsom, CA (US); Ivan Herrera, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 814 days.

(21) Appl. No.: 12/286,190

(22) Filed: Sep. 29, 2008

(65) Prior Publication Data

US 2010/0083021 A1   Apr. 1, 2010

(51) Int. Cl.
*G06F 1/00* (2006.01)

(52) U.S. Cl. ..................................... 713/322
(58) Field of Classification Search ........... 713/300–340
See application file for complete search history.

(56) References Cited

U.S. PATENT DOCUMENTS

| | | | | |
|---|---|---|---|---|
| 4,024,475 A | * | 5/1977 | Bragas et al. | 455/228 |
| 5,758,170 A | * | 5/1998 | Woodward et al. | 710/267 |
| 5,760,636 A | * | 6/1998 | Noble et al. | 327/513 |
| 6,279,114 B1 | * | 8/2001 | Toombs et al. | 713/300 |
| 6,425,086 B1 | * | 7/2002 | Clark et al. | 713/322 |
| 6,823,240 B2 | * | 11/2004 | Cooper | 700/299 |
| 7,013,406 B2 | * | 3/2006 | Naveh et al. | 713/501 |
| 7,093,147 B2 | | 8/2006 | Farkas et al. | |
| 2004/0125514 A1 | * | 7/2004 | Gunther et al. | 361/1 |
| 2006/0282692 A1 | | 12/2006 | Oh | |
| 2007/0120583 A1 | | 5/2007 | Lam et al. | |

FOREIGN PATENT DOCUMENTS

| WO | 2007/142863 A2 | 12/2007 |
|---|---|---|
| WO | 2010/036634 A2 | 4/2010 |
| WO | 2010/036634 A3 | 7/2010 |

OTHER PUBLICATIONS

International Search Report for PCT Application No. PCT/US2009/057780, mailed on May 10, 2010, 3 pages.
International Preliminary Report on Patentability for PCT Application No. PCT/US2009/057780, mailed on Apr. 7, 2011, 5 pages.
United States Patent Application No. 11/940,958, entitled, "A Method, Apparatus, and System for Optimizing Frequency and Performance in a Multi-Die Microprocessor" filed Nov. 15, 2007.

* cited by examiner

*Primary Examiner* — Paul R Myers
(74) *Attorney, Agent, or Firm* — Derek J. Reynolds (57) ABSTRACT

A processor, system, and method are disclosed. In an embodiment, the processor includes a first site and a second site. There is a link to transmit a voltage stabilization signal from the second site to the first site. In the first site voltage correction logic can dynamically modify a voltage supplied to the first site and second site. In the second site there is logic to assert the voltage stabilization signal. After asserting the voltage stabilization signal, the second site is granted at least a window of time in which the supplied voltage to the second site does not change.

24 Claims, 5 Drawing Sheets

VOLTAGE STABILIZATION FOR CLOCK SIGNAL FREQUENCY LOCKING

FIELD OF THE INVENTION

The invention relates to stabilizing voltage supplied to a multi-core processor during a clock signal frequency locking process.

BACKGROUND OF THE INVENTION

A modern multi-core processor, such as an Intel® architecture processor or another brand processor, generally has multiple power states available to allow for power conservation when the processor is not busy. The voltage supplied to the processor and the frequency of the processor may be dynamically modified during operation based on a number of factors such as the current power state of the processor. It is generally beneficial to have a stable and unchanging voltage supplied to a clock signal generation circuit, such as a phase locked loop (PLL), when the PLL is in the process of modifying (e.g. relocking) the frequency of the clock signal being output. Asynchronous voltage changes during this time may disrupt a PLL lock process.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Embodiments of a processor, system, and method to stabilize a supplied voltage during a clock signal frequency locking process are disclosed.

Many multi-core processors (MCPs) includes two sites in which the cores are located, a master site and a slave site. Both sites are coupled to a common voltage plane that supplies a voltage to each core within each site. The master site includes logic that dictates the voltage supplied to the common voltage plane. Thus, the voltage supply logic within the master site can send information to a voltage regulator to modify the voltage supplied to the voltage plane (by either increasing or decreasing the voltage). Changing the voltage supplied to the voltage plane through information sent to the voltage regulator will result in an asynchronous modification to the voltage supplied.

Both sites also include logic to generate a clock signal to utilize as a reference clock for each of the cores at each site. In many embodiments, the clock signal generation logic comprises a phase locked loop (PLL) circuit. The PLL needs a steady voltage supply while any modification takes place to the frequency of the clock signal (a relocking phase). Both the master site and the slave site have logic to assert a voltage stabilization (VStable) signal to voltage modification (i.e. correction) logic within the master site. When the VStable signal is asserted, no further voltage modification information is sent from the master site to the voltage regulator. Thus, when the PLL needs to relock the clock signal (potentially at a new frequency), VStable assertion logic within the site desiring a clock signal relock asserts the VStable signal while the PLL is being relocked. Once the PLL has finished relocking, the VStable signal is deasserted and normal voltage modification operations may resume.

Reference in the following description and claims to "one embodiment" or "an embodiment" of the disclosed techniques means that a particular feature, structure, or characteristic described in connection with the embodiment is included in at least one embodiment of the disclosed techniques. Thus, the appearances of the phrase "in one embodiment" appearing in various places throughout the specification are not necessarily all referring to the same embodiment.

In the following description and claims, the terms "include" and "comprise," along with their derivatives, may be used, and are intended to be treated as synonyms for each other. In addition, in the following description and claims, the terms "coupled" and "connected," along with their derivatives may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

Figure 1:
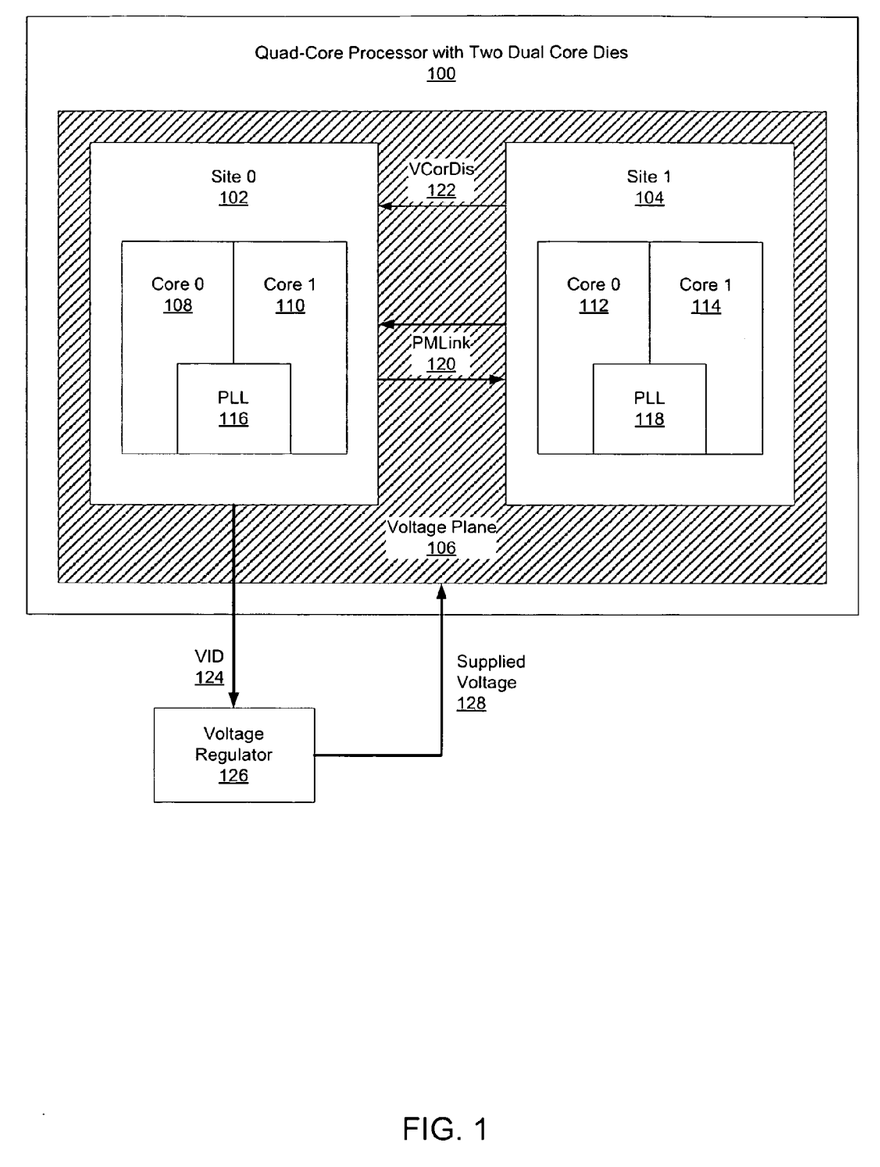
FIG. 1 is an illustration of an apparatus to stabilize a supplied voltage during a clock signal frequency locking process according to some embodiments.

FIG. 1 is an illustration of an apparatus to stabilize a supplied voltage during a clock signal frequency locking process according to some embodiments.

A quad-core processor with two dual-core dies 100 is portrayed. In many embodiments, the processor 100 includes two sites, site 0 (102) and site 1 (104). Both sites are coupled to a common voltage plane 106. Site 0 (102) includes two processing cores, core 0 (108) and core 1 (110). Site 1 (104) also includes two processing cores, core 0 (112) and core 1 (114). Each core includes logic to execute instructions. Thus, combined, the two sites have a total of four cores, hence the processor being a quad-core processor with two dual-core dies. Each site includes a phase locked loop (PLL) clock signal generation circuit, PLL 116 for site 0 (102) and PLL 118 for site 1 (104). Each PLL is capable of generating a clock signal that the cores located at each respective site can use as a reference clock. Additionally, each PLL can change the frequency of the clock signal through a relocking process. In other embodiments that are not shown, an alternative form of clock signal generation logic generates the clock signal supplied to the cores within the processor 100.

In many embodiments, a power management link (PMLink) 120 communicatively couples site 0 and site 1. The specific details of the PMLink 120 and its interface to each site can comprise one of many different link (i.e. interconnect, bus) forms. Generally, the PMLink 120 is capable of transmitting data back and forth between site 0 (102) and site 1 (104). In many embodiments, there is a master site and a slave site with respect to controlling the voltage level supplied to the voltage plane 106. In many embodiments, site 0 (102) is capable of controlling the voltage level supplied to the voltage plane 106. The voltage control process may be referred to as voltage correction.

In many embodiments, logic within site 0 (102) sends a voltage identification (VID) value 124 to a voltage regulator 126 external to the processor. The voltage regulator 126 interprets the VID value and based on that information, regulates the supplied voltage 128 to the processor 100. Thus, in many embodiments where site 0 (102) and site 1 (104) are supplied with the same voltage through common voltage plane 106, logic within site 0 (102) dictates the supplied voltage to both site 0 (102) and site 1 (104). In many other embodiments, logic within site 0 (102) may send information other than a VID 124 to the voltage regulator 126 for supplied voltage level modifications. The information sent to the voltage regulator 126 can be in any form as long as it informs the voltage regulator 126 of the new voltage to supply to the voltage plane 106.

Site 1 (104) may have different voltage requirements than site 0 (102) at any given time. Thus, in many embodiments, site 1 (104) communicates its needed voltage to site 0 (102) across the PMLink 120 so site 0 (102) can request at least that amount of voltage from the voltage regulator 126.

In many embodiments, due to power conservation logic within processor 100 such as Enhanced Intel® SpeedStep® Technology or other processor power management technology, each site with processor 100 might actively modify the frequency of the cores if the cores are switching between a sleep mode, a low frequency mode, a high frequency mode, or another such frequency-changing mode. In these embodiments, at any given time, processor power management logic may need to modify the frequency of the clock signal being supplied to the cores by PLL 116 and PLL 118. A PLL frequency locking process is not instantaneous and instead requires a finite window of time. The PLL locking (or re-locking) process requires a feedback loop circuit to help modify the PLL frequency. The feedback loop circuitry for each PLL is affected by a core voltage change, which results in longer locking (re-locking) times. During the PLL frequency locking window of time, it is greatly beneficial that the voltage supplied to the site the PLL feedback loop circuitry is located within remains stable. A PLL frequency locking process potentially will not succeed or take a longer period of time if there is a change in the voltage supplied to the PLL feedback loop circuitry. Thus, the PLLs in both site 0 (102) and site 1 (104) benefit if they are given a window of time in which they can be sure that the voltage they are supplied will not change.

Therefore, in many embodiments, a voltage stabilization (VStable) signal 122 line may be supplied by site 1 (104) to site 0 (102). The line may be a single wire, an interface pin, a serial bus, or any other type of physical communication interface that would allow a single binary signal to be sent from the slave site, site 1 (104), to the master site, site 0 (102). Generally, during normal operations, the VStable signal may be low (e.g. off, idle, etc.). At a given time, site 1 (104) may want to relock PLL 118 to supply core 0 (112) and core 1 (114) with a different frequency. At this point, logic within site 1 (104) may assert the VStable signal 122. In many embodiments, the VStable signal 122 informs site 0 (102) to stop any further voltage correction and returns the supplied voltage to the standard maximum supply voltage for a window of time. In many other embodiments, the VStable signal 122 also informs site 0 (102) to stop any other additional asynchronous changes to voltage supplied to the voltage plane for the window of time.

There is a period of time, which can be referred to as a voltage stabilization time, which is the maximum time it would take the voltage regulator 126 to stabilize a supplied voltage to the voltage plane 106 at the maximum supply level. The actual voltage stabilization time may differ with different processors, different voltage regulators, and in different implementations. For a given processor, the maximum voltage stabilization time would be the time it would take a voltage regulator's supplied voltage to ramp from the lowest allowable supply voltage to the non-corrected maximum supply voltage.

Additionally, there may be additional time added to the maximum period of time to the stabilize voltage for elements such as VStable 122 transit time and VID 124 transit time and potentially other finite delays in logic. Once the period of time equaling the maximum voltage stabilization time is determined, logic within site 1 (104) can be assured that once the period of time has passed after the assertion of the VStable signal 122 there will be a window of time in which the voltage supplied to the voltage plane 106 is stable. During that window of time, PLL 118 can be assured that a PLL relock may occur without a disruption due to a voltage change.

In many embodiments, once PLL 118 has completed the relock process, logic within site 1 (104) may deassert the VStable signal 122. The deassertion informs master site 0 (102) that it can once again dynamically modify the voltage level supplied to the voltage plane by sending a new VID 124 (or other voltage information) to the voltage regulator 126.

In many embodiments, the same or similar logic to the VStable assertion logic in site 1 (104) also resides within site 0 (102). Site 0 (102) PLL relocking logic also requires a stable voltage to relock PLL 116. Thus, logic within site 0 (102) may assert VStable internally (not shown in FIG. 1) to guarantee the stabilized voltage window for PLL 116.

Figure 2:
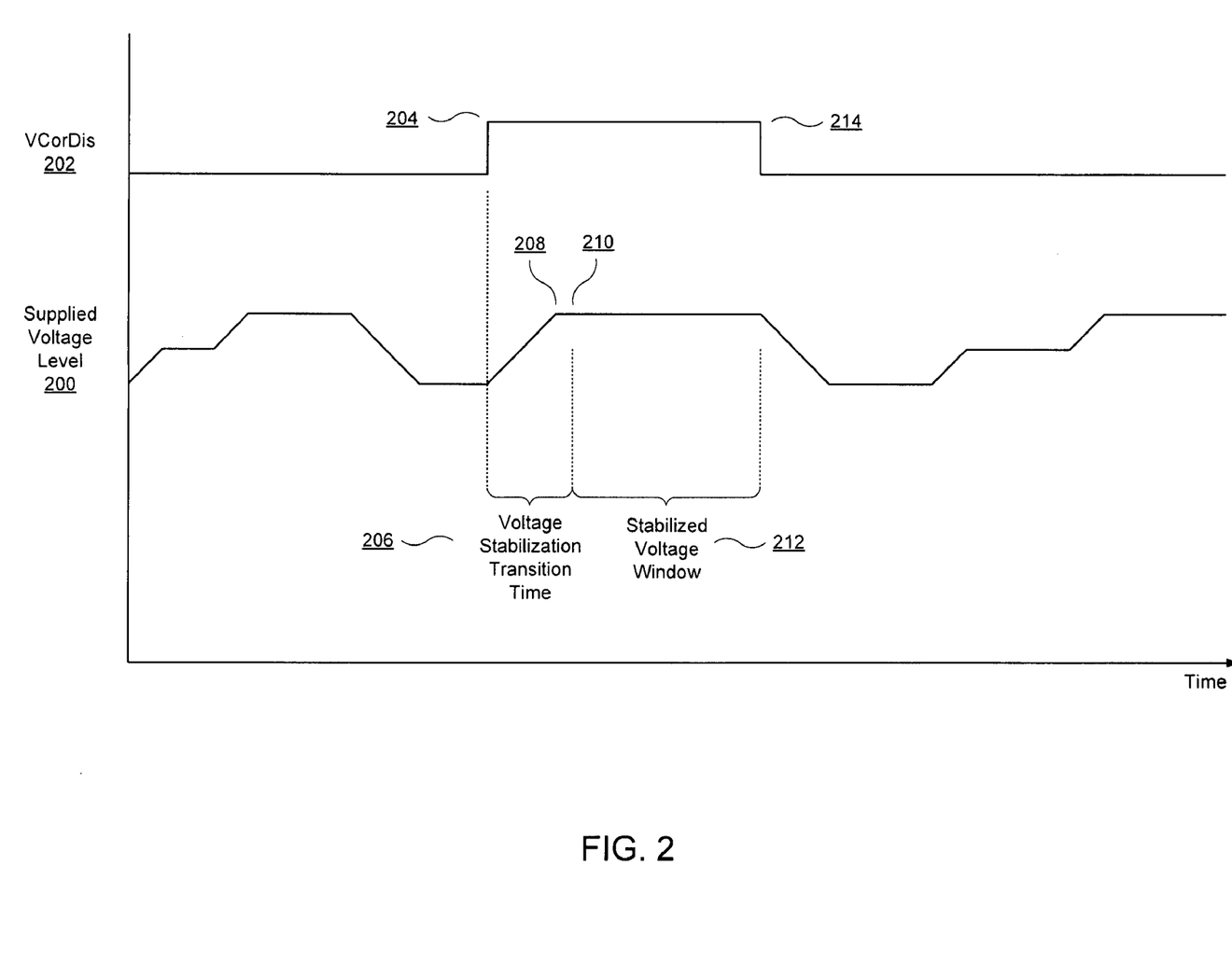
FIG. 2 illustrates a timing diagram of the voltage stabilization signal and the supplied voltage to the processor according to some embodiments.

FIG. 2 illustrates a timing diagram of the voltage stabilization signal and the supplied voltage to the processor according to some embodiments.

The X-axis of the diagram represents time, and thus, the supplied voltage level 200 shows periods of time where the supplied voltage is maintaining a constant level and other periods of time where the supplied voltage is changing (increasing or decreasing relative to the previous voltage level. During the initial point in time that the diagram begins, the VStable signal 202 is deasserted (i.e. "0").

At a certain point in time (time 204), the VStable signal 202 is asserted. At the moment the signal is asserted, the voltage stabilization transition period of time 206 begins. As shown in the diagram, at the beginning of this period of time, the supplied voltage level 200 is low (i.e. below the standard maximum supplied voltage level). During the voltage stabilization transition period of time 206, the supplied voltage ramps from any lower voltage level up to the standard maximum voltage supply level (time 208) and stabilizes at the new level. At the same time that the voltage stabilizes at the standard maximum level or at a subsequent point in time (for example, time 210), the voltage stabilization transition period of time 206 reaches its end. At this point, the logic that originally asserted the VStable signal 202 realizes the stabilized voltage window of time 212 has been reached. Thus, the logic asserting the VStable signal 202 may be guaranteed a certain window of time in which the supplied voltage will not change. Generally, the window of time is of an indefinite length, which allows the voltage to remain stabilized until a point in time that the VStable signal 202 is deasserted. When the stabilized voltage window 212 begins (at time 210 in FIG. 2), logic to relock the PLL can begin the process of relocking at a certain frequency. The length in time a PLL takes to relock is implementation specific. The VStable signal 202 will remain asserted until the PLL relock procedure is complete. Thus, depending on the speed of the relock logic, the components within the PLL, and other system-dependent determinative variables, the stabilized voltage window may vary between computer systems.

In many embodiments, once the PLL has successfully been relocked, the VStable signal assertion logic may deassert the VStable signal 202. For example, the deassertion is captured in the diagram at time 214. Deasserting the signal informs the voltage change (i.e. correction) logic that it may modify the voltage at any time going forward.

Figure 3:
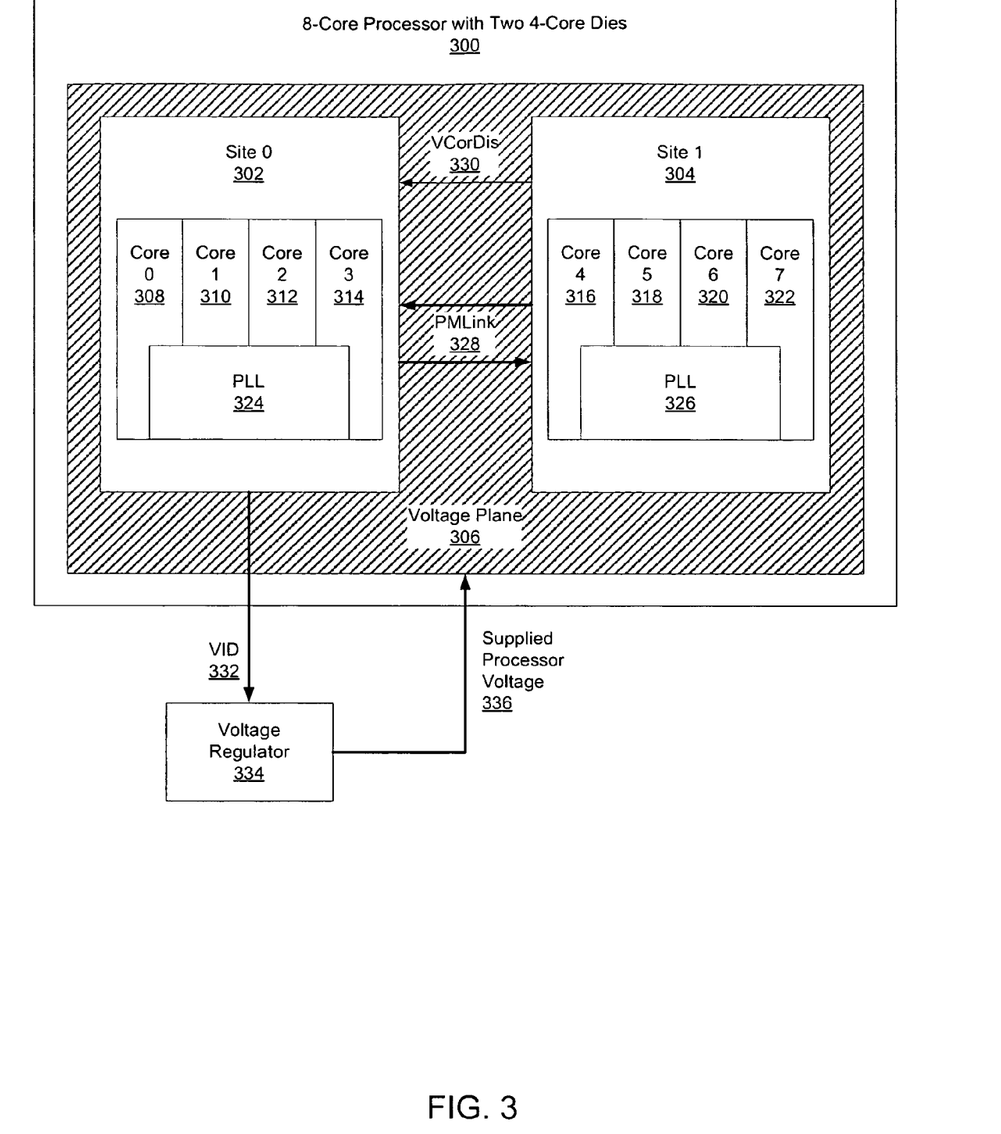
FIG. 3 is an illustration of an apparatus to stabilize a supplied voltage during a clock signal frequency locking process according to some embodiments.

FIG. 3 is an illustration of an apparatus to stabilize a supplied voltage during a clock signal frequency locking process according to some embodiments.

An 8-core processor with two 4-core dies 100 is portrayed. In many embodiments, the processor 200 includes two sites, site 0 (302) and site 1 (304). Both sites are coupled to a common voltage plane 306. Site 0 (302) includes four processor cores, core 0 (308), core 1 (310), core 2 (312), and core 3 (314). Site 1 (304) also includes four processor cores, core 4 (316), core 5 (318), core 6 (320), and core 7 (322). Each core includes logic to execute instructions. Thus, combined, the two sites have a total of 8 cores, hence the processor being an 8-core processor with two 4-core dies. Each site includes a PLL feedback loop circuit, PLL 324 for site 0 (302) and PLL 326 for site 1 (304), to help generate a clock signal. Each PLL is capable of generating a clock signal that the core located at each respective site can use as a reference clock. Additionally, each PLL can change the frequency of the clock signal through a re-locking process.

In many embodiments, a power management link (PM-Link) 328 communicatively couples site 0 and site 1. The specific details of the PMLink 328 and its interface to each site are discussed above in reference to FIG. 1. In many embodiments, there is a master site and a slave site with respect to controlling the voltage level supplied to the voltage plane 306. In many embodiments, logic within site 0 (302) is capable of controlling the voltage level supplied to the voltage plane 306. The voltage control process may be referred to as voltage correction.

In many embodiments, logic within site 0 (302) sends a voltage identification (VID) value 332 to a voltage regulator 334 external to the processor. The voltage regulator 334 interprets the VID value and based on that information, regulates the supplied voltage 336 to the processor 300. The VStable signal assertion logic is also described above in reference to FIG. 1.

Figure 4:
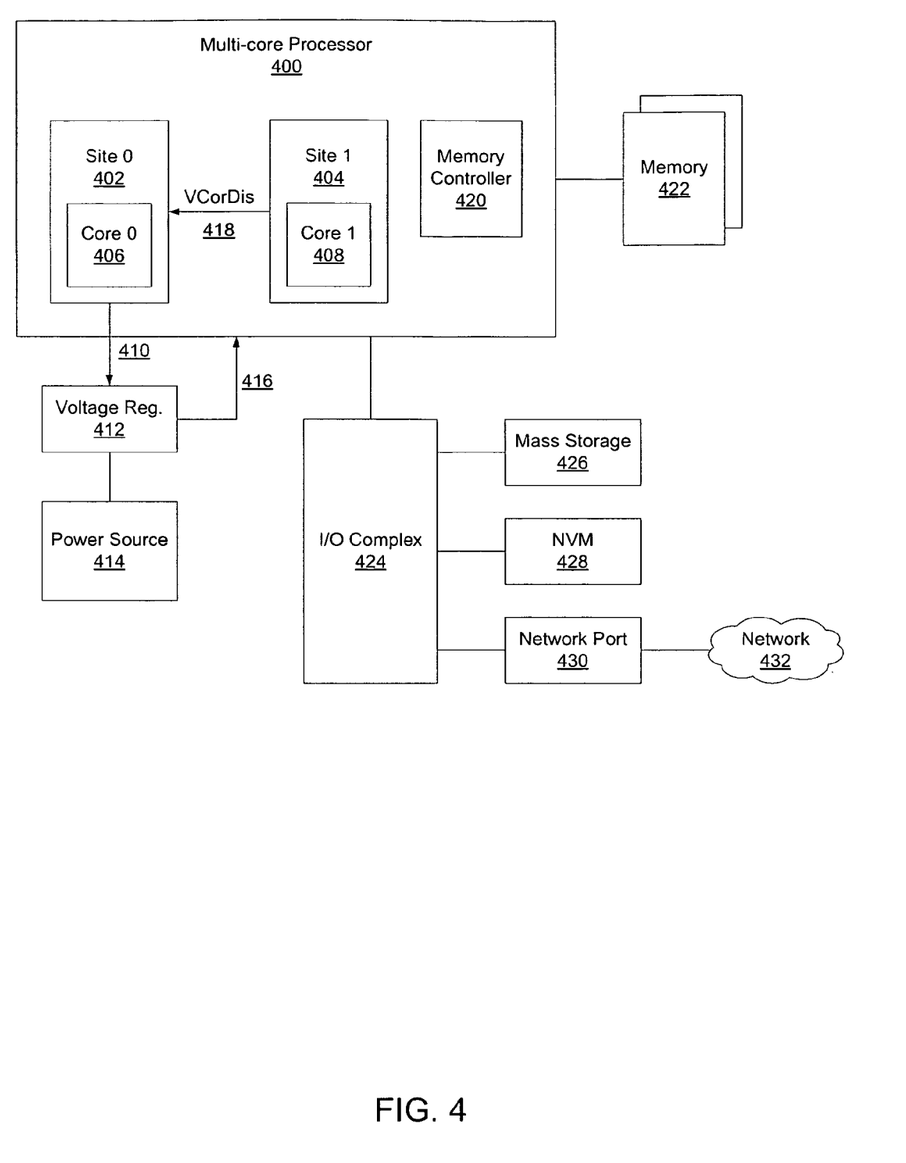
FIG. 4 is an illustration of a computer system to stabilize a supplied voltage during a clock signal frequency locking process according to some embodiments.

FIG. 4 is an illustration of a computer system to stabilize a supplied voltage during a clock signal frequency locking process according to some embodiments.

The computer system includes a multi-core processor (MCP) 400. The MCP 400 includes two sites, site 0 (402) and site 1 (404). In the embodiment shown in FIG. 4, each site includes a single processor core, core 0 (406) in site 0 (402) and core 1 (408) in site 1 (404). In other embodiments not shown, the number of cores per site may be more than one. For example, in other embodiments, there may be two or four cores per site or more.

Site 0 (402), which may be referred to as the master site, controls the voltage supplied to the processor by sending voltage information 410 to a voltage regulator 412. The voltage regulator 412, receives power supplied from a power source 414, and regulates the voltage specifically supplied to the processor (416). Logic within site 0 (402) can continuously modify the supplied voltage 416 by sending new voltage information 410 at any given time to the voltage regulator 412.

In many embodiments, a line coupling site 1 (404) to site 0 (402), may transport a VStable signal 418. When logic within site 1 (404) asserts the signal, site 0 (402) will discontinue modifying the voltage supplied to the processor 416. In other words, after logic within site 0 (402) notices the VStable signal 418 has been asserted, the logic will discontinue sending modified voltage information 410 to the voltage regulator 412. This will create a stabilized voltage for a window of time. In many embodiments, this window of time may be maintained until the VStable signal 418 has been deasserted. In some embodiments, when the VStable signal arrives at site 0 (402), logic within site 0 (402) may begin a timer and if the VStable signal has not been deasserted by the time the timer runs out, voltage modifications may resume.

Figure 5:
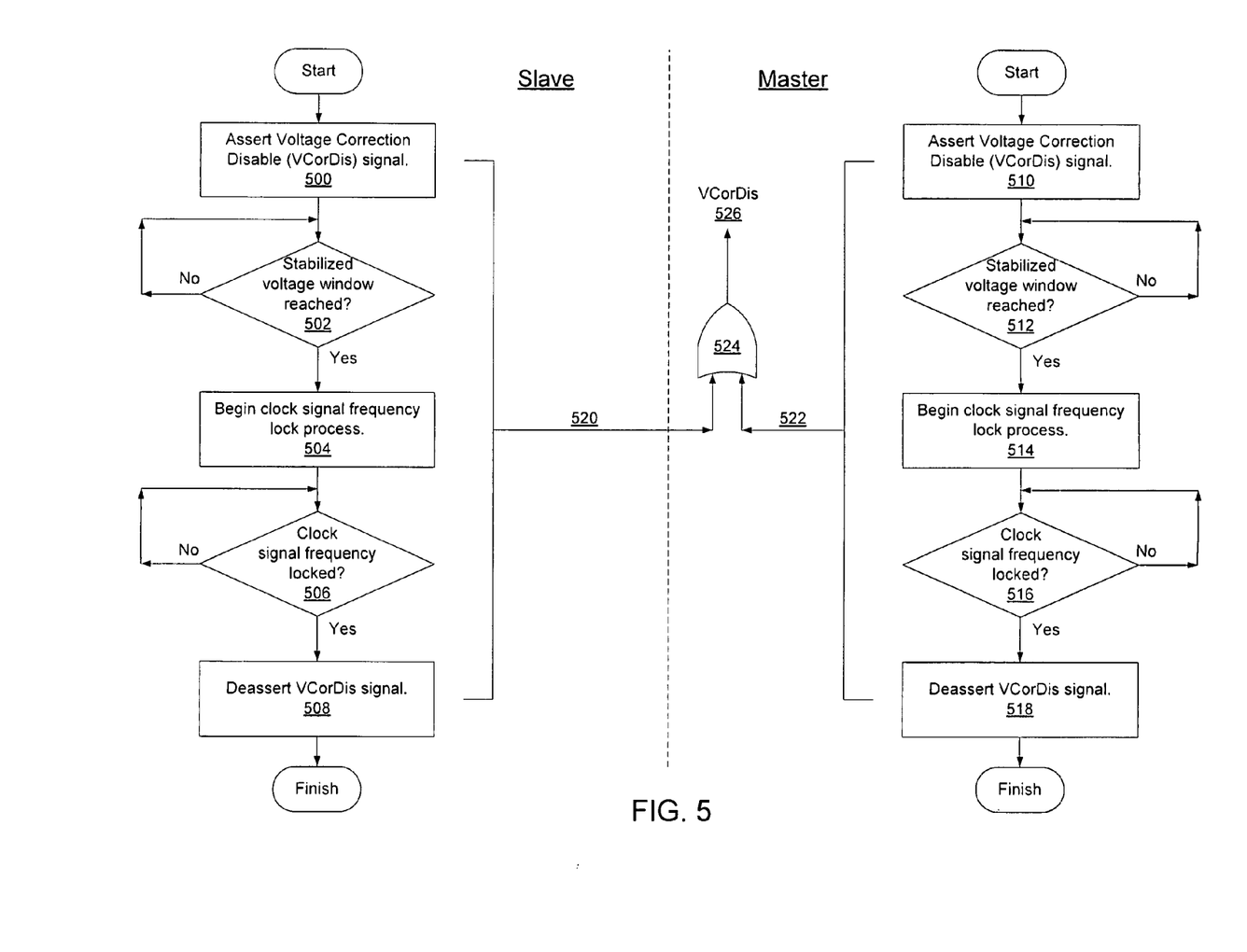
FIG. 5 is a flow diagram of an embodiment of a process to stabilize a supplied voltage during a clock signal frequency locking event.

The system in FIG. 5 also may include a memory controller 420 to control access to system memory 422. System memory 422 may comprise one or more types of dynamic random access memory (DRAM), such as a form of double data rate (DDR) synchronous DRAM, and/or one or more types of non-volatile memory (NVM) such as a flash-based memory.

Additionally, the system may also include an I/O (input/output) complex 424. The I/O complex may have one or more integrated I/O host controllers to control communication between the MCP 400 and one or more peripheral devices such as a mass storage device 426 (e.g. a hard disk drive), a NVM storage device 428, and a network port 430 that provides access between the computer system and a network 432. The I/O host controller(s) may utilize one or more different I/O interfaces such as the USB (Universal Serial Bus) interface, the PCI (Peripheral Component Interconnect) Express® interface, an IEEE (Institute of Electrical and Electronics Engineers) 1394 "Firewire" interface, or one or more other I/O interfaces.

In many embodiments that are not shown, a graphics processing unit (GPU) may be coupled to the MCP 400 or integrated into the MCP 400 to provide information to a display device (e.g. a flat-panel monitor) for viewing information by a user.

FIG. 5 is a flow diagram of an embodiment of a process to stabilize a supplied voltage during a clock signal frequency locking event.

The process may be performed by hardware (e.g. physical components within a general purpose computer system), by software (e.g. program instructions stored within the memory of a computer system, or a combination of both. FIG. 5 illustrates the process steps performed on both a slave site in a MCP and the master site in the MCP. These sites are delineated by the dashed line in the middle of FIG. 5. The processing logic is therefore in both sites. Additionally, the results of the processing logic is the assertion and deassertion of the VStable signal, as discussed above in reference to FIGS. 1-4.

Turning now to FIG. 5, the process for the slave site begins with processing logic in the slave site asserting the VStable signal (processing block 500). In many embodiments, processing logic in the slave site may begin a timer to count down the voltage stabilization transition period of time (as discussed above in reference to FIG. 2). Processing logic in the slave site may check to determine if the voltage stabilization transition period of time has passed and the stabilized voltage window has been reached (processing block 502).

If the stabilized voltage window has not been reached, then processing logic returns to block 502. Otherwise, if the stabilized voltage window has been reached, the processing logic begins a clock signal frequency lock process (processing block 504). Next, processing logic within the slave site checks to see if the clock signal frequency is locked (processing block 506). If not, processing logic returns to block 506. Otherwise, if the frequency has been locked, then processing logic within the slave site deasserts the VStable signal (processing block 508) and the process is finished within the slave site.

Turning now to the master site, the same process takes place. Specifically, the process for the master site begins with processing logic in the master site asserting the VStable signal (processing block 510). In many embodiments, processing logic in the master site may begin a timer to count down the voltage stabilization transition period of time (as discussed above in reference to FIG. 2). Processing logic in the master site may check to determine if the voltage stabilization transition period of time has passed and the stabilized voltage window has been reached (processing block 512).

If the stabilized voltage window has not been reached, then processing logic returns to block 512. Otherwise, if the stabilized voltage window has been reached, the processing logic begins a clock signal frequency lock process (processing block 514). Next, processing logic within the master site checks to see if the clock signal frequency is locked (processing block 516). If not, processing logic returns to block 516. Otherwise, if the frequency has been locked, then processing logic within the master site deasserts the VStable signal (processing block 508) and the process is finished within the master site.

The dotted lines from both the slave and master sites show the processing blocks that assert and deassert the VStable signal. Specifically, the slave site assertion begins at block 500 and is asserted across line 520 to OR gate 524, which asserts the actual VStable signal 526 within the master site. Alternatively, the master site assertion begins at block 510 and is asserted across line 522 to OR gate 524, which asserts the actual VStable signal 526 within the master site.

Thus, embodiments of a processor, system, and method to stabilize a supplied voltage during a clock signal frequency locking process are disclosed. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A processor, comprising:
a first site and a second site;
a link to transmit a voltage stabilization signal from the second site to the first site;
voltage correction logic in the first site, coupled to the link, to dynamically modify a voltage supplied to the first site and second site; and
logic within the second site, coupled to the link, to assert the voltage stabilization signal,
wherein the second site is granted at least a window of time after asserting the voltage stabilization signal in which the supplied voltage to the second site does not change.

2. The processor of claim 1, further comprising:
clock signal generation logic in the second site to supply a clock signal at one of a plurality of frequencies for the second site.

3. The processor of claim 2, further comprising:
the clock signal generation logic to lock the clock signal at a first frequency during the window of time in which the supplied voltage to the second site does not change.

4. The processor of claim 3, wherein the second site includes logic to:
wait a first period of time after asserting the voltage stabilization signal while the supplied voltage stabilizes; and
allow the clock signal generation logic to begin locking the clock signal at the first frequency after the first period of time.

5. The processor of claim 4, wherein the second site includes logic to deassert the voltage stabilization signal when the clock signal has locked at the first frequency.

6. The processor of claim 1, wherein each site has one or more processor cores.

7. The processor of claim 1, wherein both the first site and second site reside on a single voltage plane.

8. The processor of claim 1, further comprising:
logic within the first site to assert the voltage stabilization signal,
wherein the first site is granted at least the window of time after asserting the voltage stabilization signal in which the supplied voltage to the first site does not change.

9. A system, comprising:
a multi-site processor, each with at least two cores;
a link to transmit a voltage stabilization signal from a second site in the multi-site processor to a first site in the multi-site processor;
voltage correction logic in the first site, coupled to the link, to dynamically modify a voltage supplied to the first site and second site; and
logic within the second site, coupled to the link, to assert the voltage stabilization signal,
wherein the second site is granted at least a window of time after asserting the voltage stabilization signal in which the supplied voltage to the second site does not change.

10. The system of claim 9, further comprising:
clock signal generation logic in the second site to supply a clock signal at one of a plurality of frequencies for the second site.

11. The system of claim 10, further comprising:
the clock signal generation logic to lock the clock signal at a first frequency during the window of time in which the supplied voltage to the second site does not change.

12. The system of claim 11, wherein the second site includes logic to:
wait a first period of time after asserting the voltage stabilization signal while the supplied voltage stabilizes; and
allow the clock signal generation logic to begin locking the clock signal at the first frequency after the first period of time.

13. The system of claim 12, wherein the second site includes logic to deassert the voltage stabilization signal when the clock signal has locked at the first frequency.

14. The system of claim 9, wherein each site has one or more processor cores.

15. The system of claim 9, wherein both the first site and second site reside on a single voltage plane.

16. The system of claim 9, further comprising:
logic within the first site to assert the voltage stabilization signal,
wherein the first site is granted at least the window of time after asserting the voltage stabilization signal in which the supplied voltage to the first site does not change.

17. A method, comprising:
transmitting a voltage stabilization signal from a second site on a multi-site processor to a first site on the multi-core processor, wherein the first site dynamically modifies a voltage supplied to the first site and the second site;

granting the second site at least a window of time after the assertion of the voltage stabilization signal in which the supplied voltage to the second site does not change.

18. The method of claim 17, further comprising:
supplying a clock signal at one of a plurality of frequencies for the second site.

19. The method of claim 18, further comprising:
locking the clock signal at a first frequency of the plurality of frequencies during the window of time in which the supplied voltage to the second site does not change.

20. The method of claim 19, further comprising:
waiting a first period of time after the assertion of the voltage stabilization signal while the supplied voltage stabilizes; and
allowing the clock signal to begin a locking process at the first frequency after the first period of time.

21. The method of claim 20, further comprising:
deasserting the voltage stabilization signal when the clock signal has completed the locking process at the first frequency.

22. The method of claim 17, wherein each site has one or more processor cores.

23. The method of claim 17, wherein both the first site and second site reside on a single voltage plane.

24. The method of claim 17, further comprising:
asserting the voltage stabilization signal from the first site, wherein the first site is granted at least the window of time after asserting the voltage stabilization signal in which the supplied voltage to the first site does not change.

* * * * *